Patented Jan. 10, 1939

2,143,387

UNITED STATES PATENT OFFICE 2,143,387

WATERPROOF PAINT

Lyman E. Rutter, Barnsdall, Okla.

No Drawing. Application January 5, 1937,
Serial No. 119,079

12 Claims. (Cl. 134—53)

This invention relates to coating compositions and has particular reference to compositions for coating and waterproofing roofs.

The material commonly used for coating roofs consists of straight asphalt and is applied by heating the asphalt to a molten condition and spreading and/or flowing the same over the roofing material. Asphalt in a cold condition, as is well known, is hard and brittle and because of this characteristic has a tendency to crack and shatter when chilled after it is applied to a roof. Upon being subjected to heat, as in the summer, it also tends to soften and run, in either case rendering the roof covering permeable to moisture.

Such asphalt coating compositions have been modified by the addition of solvents in order that they might be applied by spraying or brushing. With this diluted type of coating composition only a thin coating of the asphalt may be applied to a roof. Upon being chilled, it becomes brittle and hard and checks and cracks.

Such asphalt coating compositions have also been further modified by the addition of oily materials in order to reduce the cracking and checking. However, the oily material tends to cause the asphalt to melt much more readily and its tendency to run and creep in hot weather is further increased. Also, because of the presence of the oily material, the asphalt film never dries properly.

An object of the present invention is to produce an asphalt base coating composition which will neither run nor creep when subjected to summer temperature conditions, nor shatter nor crack when subjected to winter temperature conditions.

A further object of the invention is to produce a coating composition having an asphalt base which by suitable preparation may be applied to a roof either by melting and spreading, by painting or by trowelling in a cold condition.

The objects of the invention have been achieved by mixing with the asphalt a suitable waxy material of such characteristics that it forms a perfect solution with the asphalt, increases the melting point of the mixture, and yet maintains the whole mixture plastic at temperatures below 32° F.

A wax suitable for this purpose must have a melting point higher than 140° F. and preferably above 160° F. This wax must, in addition, be oil free in order that the coating composition will have the desired drying characteristics. In addition to these characteristics, the wax must retain a high degree of plasticity at temperatures below freezing, that is, 32° F.

Waxes of the type suitable for use with asphalt to produce my waterproofing composition may be derived from petroleum wax by distilling the petroleum wax to a residue having a flash point of about 550° F. or above. The residue is dissolved in a selective solvent, preferably ethylene dichloride, at about 180° F. and then cooled to about 70° to 85° F. to separate waxes of the desired melting point by crystallization from the solvent. The crystallized wax is filtered out of the solution and because it contains some occluded oils is washed on the filter with additional solvent until it is oil free. The oil free wax is again dissolved in clean solvent by heating it to a relatively high temperature and final separation is made by distilling off the solvent, thereby leaving, as a residue, a wax having a finely crystalline or amorphous physical structure and an extremely high melting point, that is, above 140° F., and capable of being subjected to sharp bending without cracking or shattering at low temperatures.

These waxes, or other waxes of this type, may be mixed with asphalt in suitable proportions to produce a complete solution of the wax and asphalt. This step may be carried out by melting the asphalt and wax at a temperature of about 400° F. and thoroughly mixing them by means of any suitable agitating device. The asphalt itself preferably must be of high grade ductile quality and having a melting point between 160° F. and 180° F., determined by the ring and ball method.

The ratio of asphalt to wax is important because if too great an excess of wax is used the coating composition becomes mealy and crumbles in use. If an insufficient quantity of wax is used the coating composition does not have the proper plasticity at low temperatures.

Suitable proportions of asphalt and wax are between 75% and 85% asphalt, by weight, to 15% to 25% wax, by weight. Proportions such as 80% asphalt to 20% wax have been found to be entirely suitable and the solution produced by mixing the ingredients in these proportions may be applied in a hot state, that is, above the melting point of the composition to roofing material. This coating composition has the advantage, over other materials, of remaining plastic enough at low temperatures not to crack and check, and having body enough at summer temperatures not to creep and run.

The wax and asphalt coating composition may be modified by the addition of a suitable solvent to produce a liquid which may be applied by brushing or trowelling.

For application with a brush, the base material, that is, the solution of wax and asphalt, may be mixed with about an equal part of solvent.

The volatility or vaporization temperature of the solvent will determine the drying tendency of the material; that is, if a highly volatile solvent is used the material will be quick drying, and if a less volatile solvent is used it will dry more slowly. Suitable solvents for use with the base material may consist of sweet petroleum distillates such as kerosene or naphtha.

A suitable mixture for brushing may be prepared as follows: The asphalt and wax may be thoroughly mixed at a temperature of about 400° F. and while the mixture is still at a temperature of about 400° F., under conditions of slow but constant agitation there is added a solvent consisting of a sweet petroleum distillate having an initial boiling point of not less than 350° F. and a 90% recovery point of not to exceed 500° F. This solvent may be kerosene. The mixture containing kerosene is agitated and gradually cooled until it reaches a temperature between 200° F. and 250° F. While agitation is continued, an additional quantity of solvent consisting of sweet petroleum distillate having an initial boiling point of 150° F. to 160° and a final boiling point of about 400° F. is added and agitation continued until a thoroughly intimate mixture is obtained. The solvent added at this later stage may be naphtha. When the solution has cooled to substantially room temperature it is ready for use and may be placed in containers for shipping and sale.

Suitable proportions for producing the brushing composition based on a final content of one gallon may be as follows:

| | | |
|---|---|---|
| Asphalt | pounds | 3.4 |
| Special wax | pound | .8 |
| Kerosene | gallon | .2 |
| Naphtha | do | .3 |

After application of this composition to the material to be waterproofed, and the solvent has evaporated, the film of asphalt and wax has the same characteristics as the composition that is applied in a hot condition; that is, it does not creep or run at relatively high temperatures or crack and check at relatively low temperatures.

The above-described waterproofing compositions also may be modified by the addition of a suitable filler, for example, asbestos fiber, to produce a cement for filling cracks, joints, or holes. The filler may be present in quantities amounting to between twenty-five per cent. (25%) and fifty per cent. (50%) by weight of the finished cement. The cement may be applied by trowelling in a cold condition if a volatile solvent is included in the composition, or in a heated condition if no solvent is included.

It will be understood from the foregoing that the invention consists of a waterproof composition having characteristics not normally present in the known types of asphalt roofing paints or compositions.

It will further be understood that the proportions of ingredients used may be suitably varied without varying the characteristics of the coating composition. Therefore, the examples given should be considered as illustrative only and not as limiting the scope of the invention defined in the following claims.

I claim:

1. A waterproof roof coating composition characterized by resistance to cracking and checking at temperatures as low as about 32° F. and to creeping and running when hot, comprising 75 to 85 parts asphalt and 25 to 15 parts oil free mineral oil wax having a melting point above 140° F. and being so plastic that the wax may be bent sharply without shattering at temperatures below 32° F.

2. A waterproof roof coating composition characterized by resistance to cracking and checking at temperatures as low as about 32° F. and to creeping and running when hot, comprising 75 to 85 parts asphalt and 25 to 15 parts oil free mineral oil wax having a melting point above 160° F. and being so plastic that the wax may be bent sharply without shattering at temperatures below 32° F.

3. A waterproof roof coating composition characterized by resistance to cracking and checking at temperatures as low as about 32° F. and to creeping and running when hot, comprising 75 to 85 parts asphalt and 25 to 15 parts of oil free mineral oil wax having a melting point above 140° F. and being so plastic that the wax may be bent sharply without shattering at temperatures below 32° F. dissolved in petroleum distillate.

4. A waterproof roof coating composition characterized by resistance to cracking and checking at temperatures as low as about 32° F. and to creeping and running when hot, comprising 75 to 85 parts of asphalt, and 25 to 15 parts of an oil free mineral oil wax having a melting point above 140° F. and being so plastic that the wax may be bent sharply without shattering at temperatures below 32° F. dissolved in a solvent consisting of kerosene and naphtha.

5. A waterproof roof coating composition characterized by resistance to cracking and checking at temperatures as low as about 32° F. and to creeping and running when hot, comprising 75 to 85 parts of asphalt, and 25 to 15 parts of an oil free mineral oil wax having a melting point above 160° F. and being so plastic that the wax may be bent sharply without shattering at temperatures below 32° F. dissolved in a solvent consisting of kerosene and naphtha.

6. A waterproof roof coating composition characterized by resistance to cracking and checking at temperatures as low as about 32° F. and to creeping and running when hot, comprising a solution in the proportions of approximately 3.4 pounds of asphalt to .8 pound of oil free mineral oil wax having a melting point above 140° F. and retaining sufficient plasticity that the wax may be bent sharply without shattering at temperatures below 32° F. dissolved in one-half gallon of petroleum distillate.

7. A waterproof roof coating composition characterized by resistance to cracking and checking at temperatures as low as about 32° F. and to creeping and running when hot, comprising a solution in the proportions of approximately 3.4 pounds of asphalt to .8 pound of oil free mineral oil wax having a melting point above 160° F. and retaining sufficient plasticity that the wax may be bent sharply without shattering at temperatures below 32° F. dissolved in one-half gallon of petroleum distillate.

8. A waterproof roof coating composition, characterized by resistance to cracking and checking at temperatures as low as about 32° F. and to creeping and running when hot, comprising a solution in the proportions of approximately 3.4 pounds of asphalt to .8 pound of oil free mineral oil wax having a melting point above 140° F. and retaining sufficient plasticity that the wax may be bent sharply without shattering at temperatures below 32° F. dissolved in a solvent consisting of substantially equal parts of kerosene and naphtha.

9. A waterproof roof coating composition characterized by resistance to cracking and checking at temperatures as low as about 32° F. and to creeping and runing when hot, comprising a solution in the proportions of approximately 3.4 pounds of asphalt to .8 pound of oil free mineral oil wax having a melting point above 160° F. and retaining sufficient plasticity that the wax may be bent sharply without shattering at temperatures below 32° F. dissolved in a solvent consisting of substantially equal parts of kerosene and naphtha.

10. A waterproof roof coating composition characterized by resistance to cracking and checking at temperatures as low as about 32° F. and to creeping and running when hot, comprising a solution in the proportions of approximately 3.4 pounds of asphalt to .8 pound of oil free mineral oil wax having a melting point above 140° F. and retaining sufficient plasticity that the wax may be bent sharply without shattering at temperatures below 32° F. dissolved in about .2 gallon of kerosene and .3 gallon of naphtha.

11. A waterproofing composition characterized by resistance to cracking and checking at temperatures as low as about 32° F. and to creeping and running when hot, comprising 75 to 85 parts of asphalt, 15 to 20 parts of an oil free wax having a melting point above 140° F. and remaining sufficiently plastic that it may be bent sharply without shattering at temperatures below 32° F. and 50 to 100 parts of a filler material.

12. A waterproof coating composition characterized by resistance to cracking and checking at temperatures as low as about 32° F. and to creeping and running when hot, comprising a solution of 75 to 85 parts of high grade asphalt having a melting point between about 160° and 180° F. and 25 to 15 parts of oil-free mineral oil wax, said wax having a melting point above 140° F. and such plasticity that sharp bending at temperatures as low as 32° F. does not cause the wax to shatter.

LYMAN E. RUTTER.

CERTIFICATE OF CORRECTION.

Patent No. 2,143,387. January 10, 1939.

LYMAN E. RUTTER.

It is hereby certified that error appears in the printed specification of the above numbered patent requiring correction as follows: Page 3, second column, line 10, claim 11, for the numeral "20" read 25; and that the said Letters Patent should be read with this correction therein that the same may conform to the record of the case in the Patent Office.

Signed and sealed this 21st day of February, A. D. 1939.

Henry Van Arsdale.

(Seal) Acting Commissioner of Patents.